United States Patent
Doyle et al.

(10) Patent No.: US 7,613,627 B2
(45) Date of Patent: Nov. 3, 2009

(54) COMPUTER-IMPLEMENTED METHOD AND SYSTEM FOR COLLECTING AND COMMUNICATING INSPECTION INFORMATION FOR A MECHANISM

(75) Inventors: Dennis Doyle, Northville, MI (US); Michael Benakovich, New Johnsonville, TN (US); Kevin Santer, Plymouth, MI (US); John Graham, Plymouth, MI (US); Joe Retzbach, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 987 days.

(21) Appl. No.: 10/770,145

(22) Filed: Feb. 2, 2004

(65) Prior Publication Data

US 2005/0171829 A1 Aug. 4, 2005

(51) Int. Cl.
*G06F 17/60* (2006.01)
(52) U.S. Cl. .............................. 705/11; 705/7; 434/219
(58) Field of Classification Search .................. None
See application file for complete search history.

(56) References Cited

U.S. PATENT DOCUMENTS

| | | | |
|---|---|---|---|
| 5,657,233 A | | 8/1997 | Cherrington et al. |
| 5,717,595 A | * | 2/1998 | Cherrington et al. ........ 705/400 |
| 5,729,452 A | * | 3/1998 | Smith et al. .................... 701/29 |
| 6,070,155 A | | 5/2000 | Cherrington et al. |
| 6,224,385 B1 | | 5/2001 | Nitta et al. |
| 6,263,322 B1 | * | 7/2001 | Kirkevold et al. ........... 705/400 |
| 6,487,479 B1 | | 11/2002 | Nelson |
| 6,512,968 B1 | * | 1/2003 | de Bellefeuille et al. ...... 701/33 |
| 6,514,079 B1 | | 2/2003 | McMenimen et al. |
| 6,524,109 B1 | | 2/2003 | Lacy et al. |
| 6,609,050 B2 | * | 8/2003 | Li ................................ 701/29 |
| 6,810,406 B2 | * | 10/2004 | Schlabach et al. ........... 707/201 |
| 6,990,461 B2 | * | 1/2006 | Bargnes et al. ................ 705/10 |
| 7,020,620 B1 | * | 3/2006 | Bargnes et al. ................ 705/10 |
| 7,171,372 B2 | * | 1/2007 | Daniel et al. .................... 705/7 |

(Continued)

FOREIGN PATENT DOCUMENTS

WO    WO 03/058581 A1    7/2003

OTHER PUBLICATIONS

Website—"Safe Air Solutions: The Complete Aircraft Inspection Software Solution," <http://www.safairsolutions.com/solution.htm>; Compact disk.

(Continued)

*Primary Examiner*—Albert DeCady
*Assistant Examiner*—Dave Robertson
(74) *Attorney, Agent, or Firm*—Raymond L. Coppiellie; Brooks Kushman P.C.

(57) ABSTRACT

An automated and computer-implemented method for collecting and communicating inspection information for a mechanism. The method includes receiving repair order information from a repair order, generating an electronic inspection form, including a questionnaire for inputting inspection information, receiving inspection information which is input into the questionnaire of the electronic inspection form, and transmitting at least a portion of each of the inspection information and the repair information to cause the repair order to be appended with the transmitted information to obtain an appended repair order. The information contained on the appended repair order is suitable for communication to an individual requesting repair of the mechanism.

15 Claims, 8 Drawing Sheets

U.S. PATENT DOCUMENTS

| | | | |
|---|---|---|---|
| 2002/0051956 A1 | 5/2002 | Thomsen | |
| 2002/0065702 A1* | 5/2002 | Caulfield | 705/9 |
| 2002/0087220 A1 | 7/2002 | Tveit et al. | |
| 2002/0103582 A1 | 8/2002 | Ohmura et al. | |
| 2002/0103583 A1 | 8/2002 | Ohmura et al. | |
| 2002/0142273 A1 | 10/2002 | Dollins et al. | |
| 2005/0049912 A1* | 3/2005 | Troyer et al. | 705/11 |

OTHER PUBLICATIONS

ADP 64591-00 Super ServiceAdvisor User Guide v 5.0, Oct. 1999 ADP, Inc., 144 pages.

ADP Support Bulletin, Administrative Reports; SSAv5.0 Super SeriviceAdvisor, Oct. 1999 ADP, Inc., 4 pages.

ADP Product Bulletin, Super ServiceAdvisor Release 5.0, Oct. 1999 ADP, Inc., 5 pages.

* cited by examiner

Multi-Point Inspection Report Card

Customer Name: _______________________  Year/Model: _______________  Date: _________

RO/ Tag: _______________  Mileage: _______________

| CHECKED AND OKAY AT THIS TIME | MAY REQUIRE FUTURE ATTENTION | REQUIRES IMMEDIATE ATTENTION |
|---|---|---|

Check Every 5,000 (or 3,000) Miles

| OK | | ADD | |
|---|---|---|---|
| ☐ | C H E C K & F I L L | ☐ | Window washer fluid level |
| ☐ | | ☐ | Transmission fluid level |
| ☐ | | ☐ | Brake fluid level |
| ☐ | | ☐ | Power steering fluid level |
| ☐ | | ☐ | Coolant recovery reservoir fluid level |
| ☐ | | ☐ | 4 x 4 transfer case, front drive axle, clutch reservoir fluid (truck only) |
| ☐ | | ☐ | Operation of horn, interior lights, exterior lamps, turn signals hazard and brake lamps |
| ☐ | | ☐ | Windshield washer spray, wiper operation and wiper blades |
| ☐ | | ☐ | Windshield for cracks, chips and pitting |
| ☐ | | ☐ | Radiator, heater, and air-conditioning hoses for leaks and damage |
| ☐ | | ☐ | Engine air cleaner filter |
| ☐ | ☐ | ☐ | Oil and/or fluid leaks |
| ☐ | ☐ | ☐ | Constant velocity (CV) drive axle boots (if equipped) |
| ☐ | ☐ | ☐ | Exhaust system (leaks, damage, loose parts) |
| ☐ | ☐ | ☐ | Drive shaft, transmission, u-joint and shift linkage (if equipped) and lubricate (as needed) |
| ☐ | ☐ | ☐ | Steering and steering linkages and lubricate |
| ☐ | ☐ | ☐ | Suspension (shocks/struts for bounce/leaks/damage) and lubricate |

Check Every 15,000 (Plus Above)

| ☐ | ☐ | ☐ | Brake system (includes lines, hoses, and parking brake) and wheel and for end-play and bearing noise |
| ☐ | ☐ | ☐ | Engine Cooling system, hoses and clamps |

Check Every 30,000 (Plus Above)

| ☐ | ☐ | Accessory drive belt(s) |
| ☐ | ☐ | Battery terminals (clean if necessary) |
| ☐ | ☐ | Clutch operation |
| ☐ | ☐ | Evaporate fuel system hoses and tubes (only at 60,000 mile intervals pre-1999 vehicles) |

Comments: _______________________________________

This Courtesy Inspection Complete by Your QualityCare Service Team!

Check Battery Performance

☐ Good
☐ Recharge
☐ Bad

Factory Spec Cold Cranking Amps ☐
Actual Cold Cranking Amps ☐

Measure Front/Rear Brake Linings

LF ☐☐☐    RF ☐☐☐
LR ☐☐☐    RR ☐☐☐

| Over 5mm or 7/32" (Disc) Or Over 2mm or 3/32" Drum |
| 3 to 5mm or 4/32" to 7/32" (Disc) or 1.01 to 2mm (Drum or 2/32" to 3/32") |
| Less than 3mm or 4/32" (Disc) or 1mm or 2/32" or less (Drum) |

Brake Measurements Not Taken This Service Visit ☐

Check Tires

TREAD DEPTH

LF
☐ 7/32 or Greater
☐ 4/32 to 6/32
☐ 3/32 or less

RF
7/32 or Greater ☐
4/32 to 6/32 ☐
3/32 or less ☐

☐ 7/32 or Greater
☐ 4/32 to 6/32
☐ 3/32 or less
LR

7/32 or Greater ☐
4/32 to 6/32 ☐
3/32 or less ☐
RR

☐☐☐ LF      RF ☐☐☐
☐☐☐ LR   WEAR PATTERN DAMAGE   RR ☐☐☐

Tire Pressure Set to Factory Recommended  FRONT ☐  REAR ☐  PSI

Service Advisor: _______________________

Technician: _______________________  Customer Signature: _______________________

Customer Copy

Report Card For:

| | | | | |
|---|---|---|---|---|
| RO: 607947 | Name: MARK KIRBY | Year/Model: 94 MUST | License: | Service Advisor: 38 |
| Tag: | VIN: 1FALP45T3RF130177 | Date: 10-02-2002 | Date: 10-02-2002 | Technician: 9311 |

Report Card

*102*

Every 5,000 (or 3,000) Miles

OK  ADD Levels
○   Washer level
○   Transmission fluid
○   Brake fluid
○   Power steering fluid
○   Coolant
○   Clutch/axle fluid (Trucks only)

Every 15,000 Miles
○ ○ Brake system
○ ○ Cooling system

Every 30,000 Miles
○ ○ Drive belt(s)
○ ○ Battery terminals
○ ○ Clutch operation
○ ○ Evaporative system ○ ○ Horn, lamps, signals
○ ○ Washer, wipers, blades
○ ○ Windshield
○ ○ Hoses
○ ○ Fluid leaks
○ ○ CV axle boots
○ ○ Exhaust system
○ ○ Drive shaft, shift linkage
○ ○ Steering, linkages
○ ○ Suspension

*106*

Battery Performance
○ Good      Factory Spec: ☐ CCA
○ Recharge
○ Bad        Factory Spec: ☐ CCA      *104*

*108*

*114*

Brake Inspection   All Measurements in mm
Disc  ○ ○  Over 5   3 to 5   Less than 3
Drum ○ ○  Over 2   1.01 to 2   1 or Less
☐ Brake Measurements Not Taken
         LF   RF
         ○ ○  ○ ○
         LR   RR
         ○ ○  ○ ○

*110*

*116*

Tire Inspection
       7/32 or Greater  4/32 to 6/32  3/32 or Less
Tread Depth   Wear Pattern/Damage
LF  ○ ○ ○   GOOD CONDITION ▼
RF  ○ ○ ○   GOOD CONDITION ▼
LR  ○ ○ ○   GOOD CONDITION ▼
RR  ○ ○ ○   GOOD CONDITION ▼

Tire Pressure   Factory Recommended: ☐ PSI

*112*

*118* → General Comments

[ CANCEL ]  [ SAVE ]  [ COMPLETE REPORT CARD ]
  *120*      *122*          *124*

| Contact List | | |
|---|---|---|
| | | Select to Print ☐ |
| 177 ☆ → MARK KIRBY | | |
| Open Date : 10-16-2002 10:15:25 AM | Days Open: 2 | Source: Follow-up Service |
| Originator: Doug Swiatkowski | Department: Service | Status: New |
| Assigned to: Mary Bierlein | | |

Cause: Vehicle was not ready when promised, Comments entered by user, Appointment was not available at requested time or day.

Total # of contacts: 1

PRINT ALL — 144
PRINT — 146
BACK — 148
NEXT — 150

142 (top bracket)
140 (whole figure)

COMPUTER-IMPLEMENTED METHOD AND SYSTEM FOR COLLECTING AND COMMUNICATING INSPECTION INFORMATION FOR A MECHANISM

REFERENCE TO A COMPUTER PROGRAM LISTING APPENDIX

This application includes a computer program listing appendix submitted on one compact disc and is incorporated into the specification by reference.

BACKGROUND OF THE INVENTION

1. Field of the Invention

One aspect of the present invention relates generally to a computer-implemented method and system for collecting and communicating inspection information for a mechanism, and more specifically, an automobile.

2. Background Art

For generations, vehicle owners have been visiting repair centers or dealerships for repair work. In general, the customer arrives at the repair center or dealership to be greeted by a vehicle service advisor, which attends to the customer's immediate repair needs. With the proliferation of computers, the vehicle service advisor often inputs repair and vehicle information into a computerized repair form and prints a hard copy of the form upon completion. The hard copy is handed over to a technician who performs the repair work.

Often, the technician will also conduct a vehicle inspection while the customer's automobile is being serviced or repaired. Recently, the vehicle inspection has become focused and streamlined with the advent of paper inspection checklists, as exemplified by FIG. 1. FIG. 1 depicts an example of a multi-point inspection report card, customer copy. Preferably, a file copy of the report card is attached under the customer copy so that the technician's markings made on the customer copy are reflected on the file copy. The report card, including the customer and file copies, is typically handed over to the vehicle service advisor, who can advise the customer if additional repair or service is recommended for their vehicle based on the inspection results. The file copy can be kept on file and the customer copy is given to the customer.

However, the non-automated and non-integrated process outlined has its drawbacks. For example, the completed checklist may not be given to the service advisor until after the vehicle has been serviced, or even after the customer has left the repair center with the repaired vehicle. Moreover, technicians may by-pass completing the checklist because completion is not tracked. Consequently, the service advisor misses an opportunity to convey additional service needs to the customer while they wait for their vehicle to be repaired. Moreover, the service advisor sometimes neglects to apprise the customer of additional service needs based on the inspection report. Further, inspection information is commonly lost since the information is collected on paper, instead of electronically. Yet other information pertaining to the repair process may not be collected, for example, information relevant to specific service advisors and technicians. Due to the communication gap and information loss, managers can have difficulty tracking the performance of their service advisors and technicians. Moreover, repair centers may miss an opportunity to provide return customers service information relating to a prior inspection or future repair needs not apparent the day of the repair.

The above-identified process can also lead to inefficiencies. Namely, the technician often has to leave the repair/inspection area to deliver the repair form to the service advisor. This additional step takes the technician away from his/her core task of repairing the vehicle.

Due to the disadvantages of the conventional method and system, there exists a need to provide an automated and integrated computer-implemented method and system for collecting and communicating inspection information for a mechanism, and more specifically, a vehicle. Moreover, there exists a need to provide an automated and integrated computer-implemented method and system for tracking and resolving customer concerns relating to the dealership experience. Furthermore, there exists a need to provide an automated and integrated computer-implemented method and system for conducting and tracking follow-up relating to a customer's dealership experience.

SUMMARY OF THE INVENTION

One advantage of the present invention is a automated, integrated, and computer-implemented method and system for managing and tracking automobile repair and inspection processes. Customer satisfaction can be enhanced by practicing the methods and/or systems of the present invention. Further, productivity of service technicians and advisors can be increased in light of prior art systems by practicing the present invention. Also, the present invention can increase repair sales for a dealership utilizing the automated, integrated, and computer implemented approach of the present invention.

According to a first embodiment of the present invention, an automated and computer-implemented method for collecting and communicating inspection information for a mechanism is disclosed. In certain embodiments, the mechanism is an automobile. The method includes receiving repair order information from a repair order, generating an electronic inspection form based on a portion of the repair order information, including a questionnaire for inputting inspection information, receiving inspection information which is input into the questionnaire of the electronic inspection form, and transmitting at least a portion of each of the inspection information and the repair information to cause the repair order to be appended with the transmitted information to obtain an appended repair order. The information contained on the appended repair order is suitable for communication to an individual requesting repair of the mechanism.

The method can further include communicating information from the appended repair order to the individual. The method can also further include transmitting an e-mail alert or electronic notification which includes at least a portion of the inspection information. In certain embodiments, the method can include determining a value for a metric based on the number of times one or more steps above can be executed.

In certain embodiments, each of the above steps can be executed one or more times. In other words, the first receiving step occurs a second number of times, the generating step occurs a second number of time, the second receiving step occurs a third number of time, the transmitting step occurs a fourth number of time, and the communicating step occurs a fifth number of times. Based on the amount of times one or more steps is executed, the method can determine a value for comparison to a metric based on at least one of the first, second, third, fourth and fifth number of times. For example, the value can be the number of inspection requests as defined by the second number of times and the metric can be inspection requests. As another non-limiting example, the value can be the number of inspections performed with feedback as defined by the third number of times and the metric can be inspections performed with feedback. Moreover, the value can be a communicating ratio defined as the ratio of the fifth number of times to the fourth number of times and the metric can be communication ratio.

In other embodiments, a sixth number of times can be defined as the number of times the communicating step is executed and results in the sale of additional service on the mechanism based on the inspection information and the value can be a closing ratio defined as the ratio of the sixth number of times to the fourth number of times and the metric can be closing ratio.

In certain embodiments, the repair order information can be received by a service management (SM) computer.

Further, the questionnaire can include a plurality of inspection items, each inspection item including two or more attention level indicators, the two or more attention level indicators including a green indicator, a yellow indicator, and a red indicator. The indicators are described in detail below.

The method of the first embodiment can further include accessing the appended repair order. The attention level for each inspection item contained in the appended repair order can be used as the basis for following up with the customer regarding potential service on the mechanism.

According to a second embodiment of the present invention, an automated and computer-implemented method for collecting and communicating inspection information for a mechanism. The method includes transmitting repair order information from a repair order, receiving inspection information input into an electronic inspection form and repair order information, appending the repair order with at least a portion of each of the inspection information and repair order information. The information contained on the appended repair order is suitable for communication to an individual reporting repair of the mechanism.

The method can further includes transmitting an e-mail alert or electronic notification which includes at least a portion of the inspection information. The method can also further includes determining a value for a metric based on the number of times one or more steps in the method of the second embodiment is executed.

According to a third embodiment of the present invention, an automated and computer-implemented system for collecting and communicating inspection information for a mechanism is disclosed. The system can include one or more server computers operably serving one or more client computers. The one or more server computers can be configured to: receive repair order information from a repair order, generate an electronic inspection form based on a portion of the repair order information, including a questionnaire for inputting inspection information, receive inspection information from the client computer which is input into the questionnaire of the electronic inspection form; and transmit at least a portion of each of the inspection information and the repair information to cause the repair order to be appended with the transmitted information to obtain an appended repair order. The information contained on the appended repair order is suitable for communication to an individual requesting repair of the mechanism.

The one or more server computers can be further configured to transmit an e-mail alert or electronic notification which includes at least a portion of the inspection information. The one or more server computers can be further configured to determine a value for a metric based on the number of times one or more steps in the system of the third embodiment is executed.

According to a fourth embodiment of the present invention, an automated and computer-implemented method for tracking follow-up relating to an individual's dealership experience is disclosed. The method includes providing an electronic customer survey relating to a dealership experience, the electronic survey is comprised of one or more questions having a quantifiable answer, each quantifiable answer having an acceptable standard. The method further includes receiving feedback in the form of the individual's answers to the survey question which is input into the electronic survey. For each question, the method compares the individual's answers to the acceptable standard. If the individual's answer fails to meet the standard, then the method generates a concern file on a first date based on one or more answers failing to meet the one or more standards, receives information from the individual regarding the concern, transmits the information to the concern file, and transmits the individual concern file to a concern resolution individual or entity. The information can be used to resolve the customer concern.

The method of the fourth embodiment can further include transmitting an action request to close a resolved concern file on a second date. Moreover, the method can include determining a resolution value based on the time between the first date and the second date. The electronic customer survey can be embedded in an e-mail sent to the individual. The mechanism can be an automobile.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 depicts a prior art example of a multi-point inspection report card;

DETAILED DESCRIPTION OF EMBODIMENTS OF THE PRESENT INVENTION

One embodiment of the present invention is an automated and computer-implemented method for collecting and communicating inspection information for a mechanism. The method includes receiving repair order information from a repair order, generating an electronic inspection form, including a questionnaire for inputting inspection information, receiving inspection information which is input into the questionnaire of the electronic inspection form, and transmitting at least a portion of each of the inspection information and the repair information to cause the repair order to be appended with the transmitted information to obtain an appended repair order. The information contained on the appended repair order is suitable for communication to an individual requesting repair of the mechanism.

Figure 2:
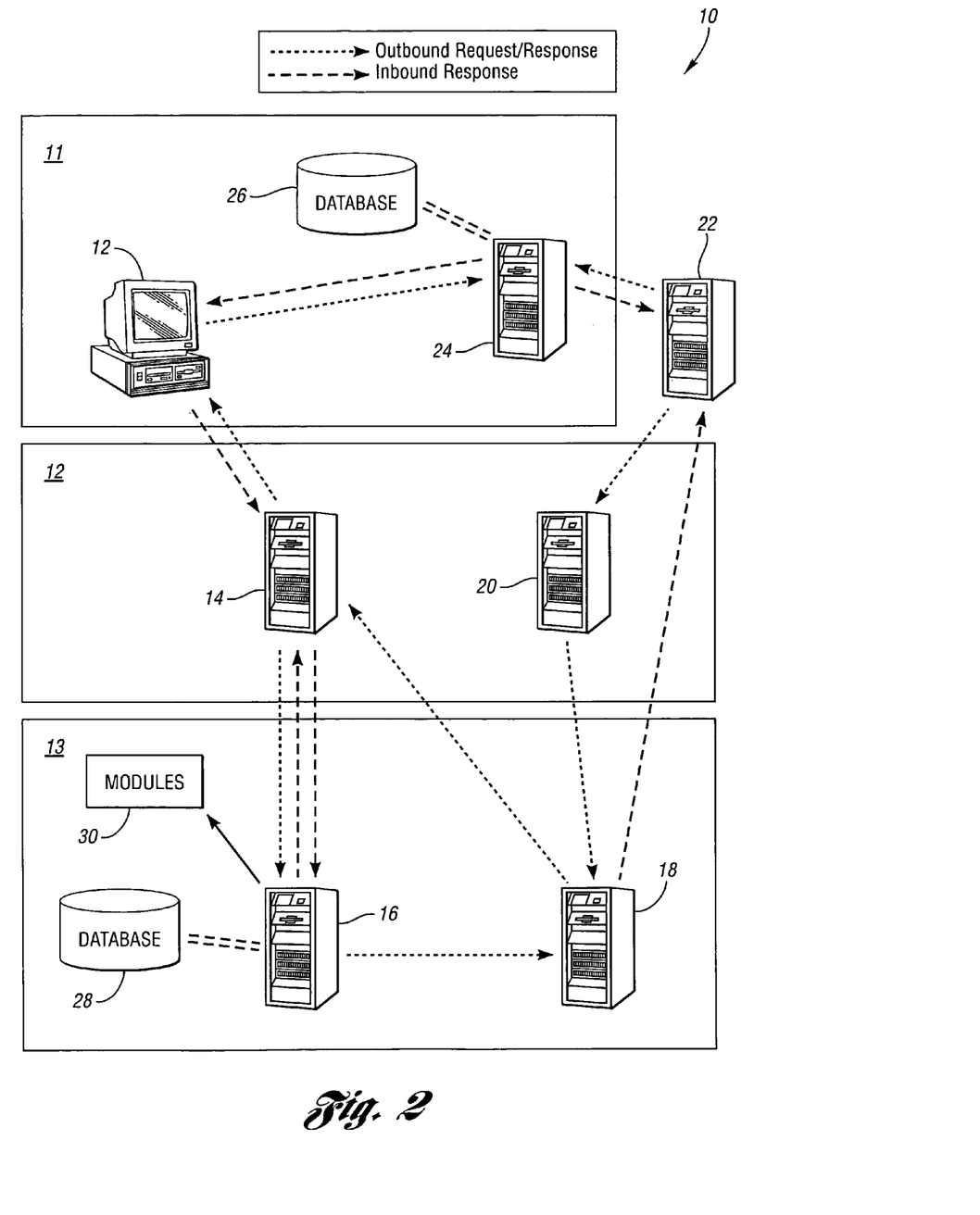
FIG. 2 diagrammatically represents a computer system according to one embodiment of the present invention.

Accordingly, FIG. 2 diagrammatically represents computer system 10 for implementing a method embodiment of the present invention. Computer system 10 can include one or more dealer computers 12, one or more web servers 14, one or more application servers 16, one or more proxy servers 18, one or more landing servers 20 (used for communications within a secure environment), and one or more extranet servers 22 (used within an external partner's secure environment) and one or more service management (SM) servers 24, and network connections linking computer 12 and servers 14, 16, 18, 20, 22 and 24. In certain embodiments, the present invention can be implemented in such a manner that one or more servers 14 and 20 can be combined into one server. It should be understood that the network connection between servers 14 and 12; servers 22 and 24; and servers 20 and 22 can include the Internet. It should be further understood the network connections between servers 12 and 14; server 24 and 26; servers 14 and 16; and server 18 and 20 can include a firewall for secure transmission of data. Non-limiting examples of computer networks suitable for application to the present invention include local area networks (LANs), wide-area networks (WANs), and mixtures thereof.

Computer system 10 can include an organized sub-network architecture, as depicted by boxes 11, 12 and 13. Box 11 represents a dealership infrastructure consisting of dealer computer 12, SM server 24 and SM database 26. Box 12 represents a first level security layer, commonly referred to as a demilitarized zone or a gate keeping zone, typical of organizations utilizing the public Internet to communicate with external partners and/or customers, which includes web server 14, landing server 20, and network connections. Box 13 represents a manufacturer sub-network, which includes application server 16, proxy server 18, and network connections.

Application server 16 can communicate with database 28. Server 16 can utilize database 28 to search and retrieve a collection of data organized in database 28. Application server 16 is configured to operably execute one or more computer modules 30 for use by computer system 10. Non-limiting examples of computer modules include, a report card module, a concern prevention and resolution (CP&R) module, and a follow-up module. These modules are described in greater detail below.

Computer 12 and servers 14, 16, 18, 20, 22 and 24 can communicate with one another through network connections and protocols. Dealer computer 12 can be in communication with web server 14 such that outbound requests and inbound responses can be received and transmitted, respectively, by computer 12 and web server 14. Web server 14 can be in communication with application server 16 such that outbound requests and inbound responses can be received and transmitted, respectively, by servers 14 and 16, through a port connection, utilizing a TCP-IP communication protocol via the Internet, including XML. Application server 16 can be in communication with proxy server 18 such that outbound requests can be transmitted by server 16 to server 18, through the use of Http protocol.

Proxy server 18 can transmit an inbound response to web server 24 using http protocol with a persistent cookie. Further, proxy server 18 can transmit an outbound request to extranet server 22, which in turn transmits a request to SM server 24. SM server 24 can access SM database 26 to retrieve data requested. Landing server 20 can transmit an inbound response to proxy server 18, using http protocol. Extranet server 22 can transmit an inbound response to landing server 20, using http protocol. It should be understood that depending on the embodiment, the communications described above can be executed using TCP-IP communication protocol via the Internet, including XML.

Figure 3:
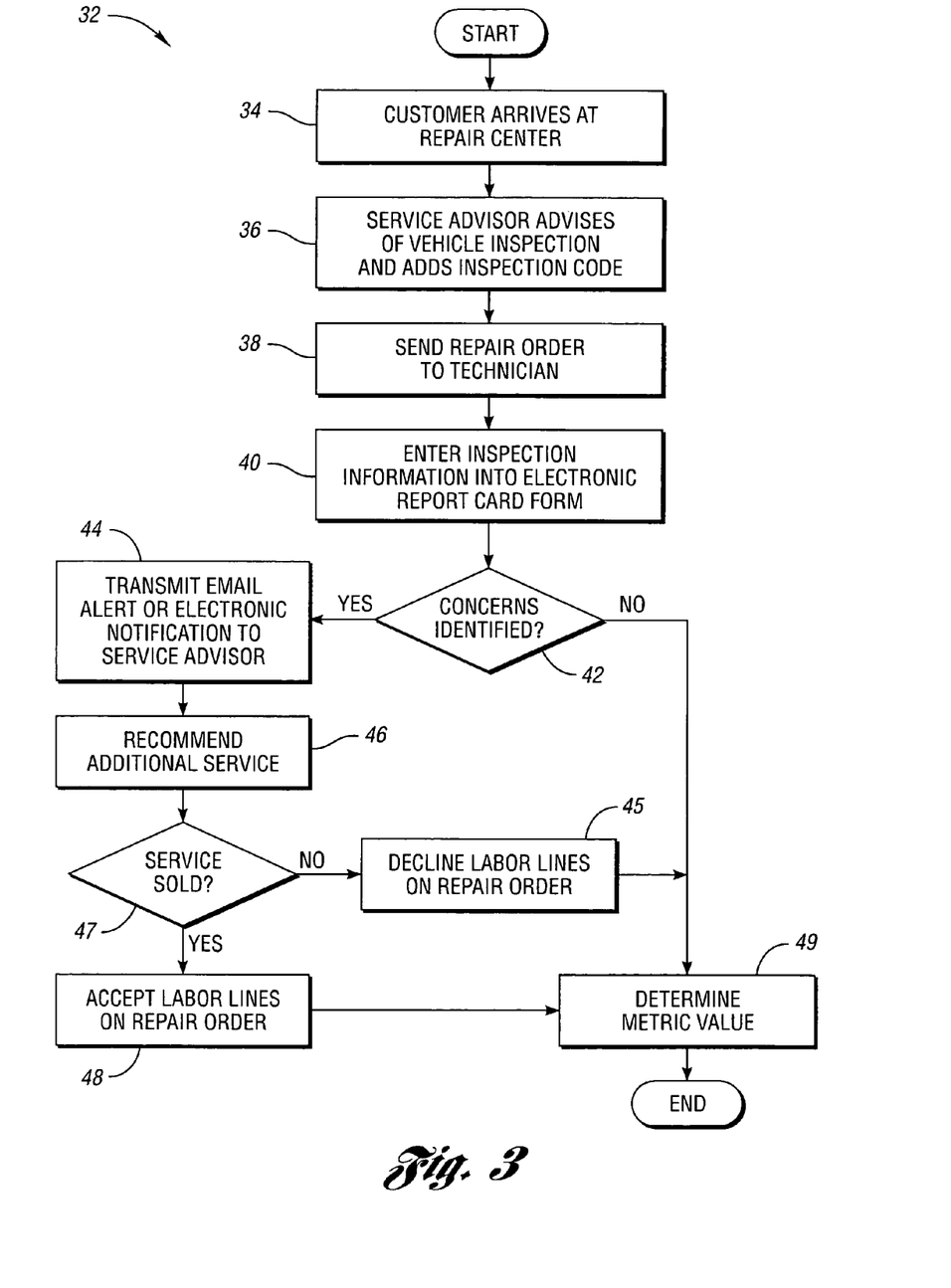
FIG. 3 is a block flow diagram depicting a method embodiment of the present invention.

FIG. 3 is block flow diagram 32 depicting a method embodiment of the present invention. It should be understood that the block flow diagram illustrates a series of steps that can be performed according to the present invention. Steps may be modified, added, omitted, or rearranged depending on the particular embodiment of the present invention.

Block flow diagram 32 represents a method of utilizing a report card module, residing on application server 16, for collecting and communicating inspection information for a mechanism. The report card module can be web-based, utilizing the Internet and a number of graphical user interfaces (GUIs) to communicate with an individual or entity that triggers the collection and communication of inspection information. For example, an individual or entity may trigger the process by requesting repair of a mechanism. An example of a mechanism includes, but is not limited to an automobile. However, it should be understood that other mechanisms are contemplated by the present invention as long as they are capable of being repaired and inspected. Non-limiting examples include automotive systems (e.g. a brake system, a transmission, or engine), snowmobiles, airplanes, and heavy machinery. Users of the report card module include, but are not limited to, individuals and entities (otherwise referred to as customers) requesting repair or inspection and repair center employees, for example, technicians, service advisors, and service managers.

According to one embodiment of the present invention, a process utilizing the report card module begins with a customer arriving at a repair center so that repair work can be performed on the customer's automobile, as depicted in block 34 of FIG. 3. Upon arriving, a service advisor may advise the customer that the repair center will perform a vehicle inspection, as depicted in block 36. The service advisor can enter a code, for example, "99P", into a user interface displayed on service manager system computer 12 and hosted by SM server 24. The code is appended to an electronic repair order that is maintained by SM server 24.

In certain embodiments, a XML package is transmitted to SM server 24 using computer system 10 to validate and append to the electronic repair order. Listing 1 and 2 included on the computer program listing appendix contain example of a XML package for validating and appending to the electronic repair order, respectfully. It should be understood that the content, arrangement and language of the generic request XML package of Listings 1 and 2 can be rearranged, modified and/or supplemented to best fit the communication between SM server 24 and application server 16. The service advisor also enters information relating to the customer and the purpose of the visit. For instance, the purpose of the visit can be a lubrication, oil and filter service.

Once the data entry is completed, the service advisor prints out a hard copy of the electronic repair order and has the customer sign it. As depicted in block 38, the repair order is delivered to a technician. Upon receiving a repair order, the technician begins the process of entering information into an electronic report card form, as depicted in block 40. It should be understood that the technician also starts to work on the repair(s) requested by the customer. In certain embodiments, the technician uses a hand-held computer device to perform the data entry. It should be understood that other computer devices can also be utilized, including, but not limited to, a desktop computer, a notebook computer, and a personal digital assistant (PDA).

The report card module generates a logon GUI for display on the hand-held computer. The logon GUI includes data entry fields for a userid and password and a "next" button for transmitting the contents of the data entry fields to the report card module for verification. After verification, the report card module generates an employee number GUI for display on the hand-held computer. The employee number GUI includes a data entry field for an employee number and a "next" button for transmitting the contents of the data entry field to the report card module for verification. The employee number can be used to track metric values for specific technicians. Upon verification, the technician is prompted to enter a repair order number, which appears on the hard copy of the electronic repair order. The report card module verifies that the repair order is valid and assigned to the employee having the employee number already entered.

Figure 6:
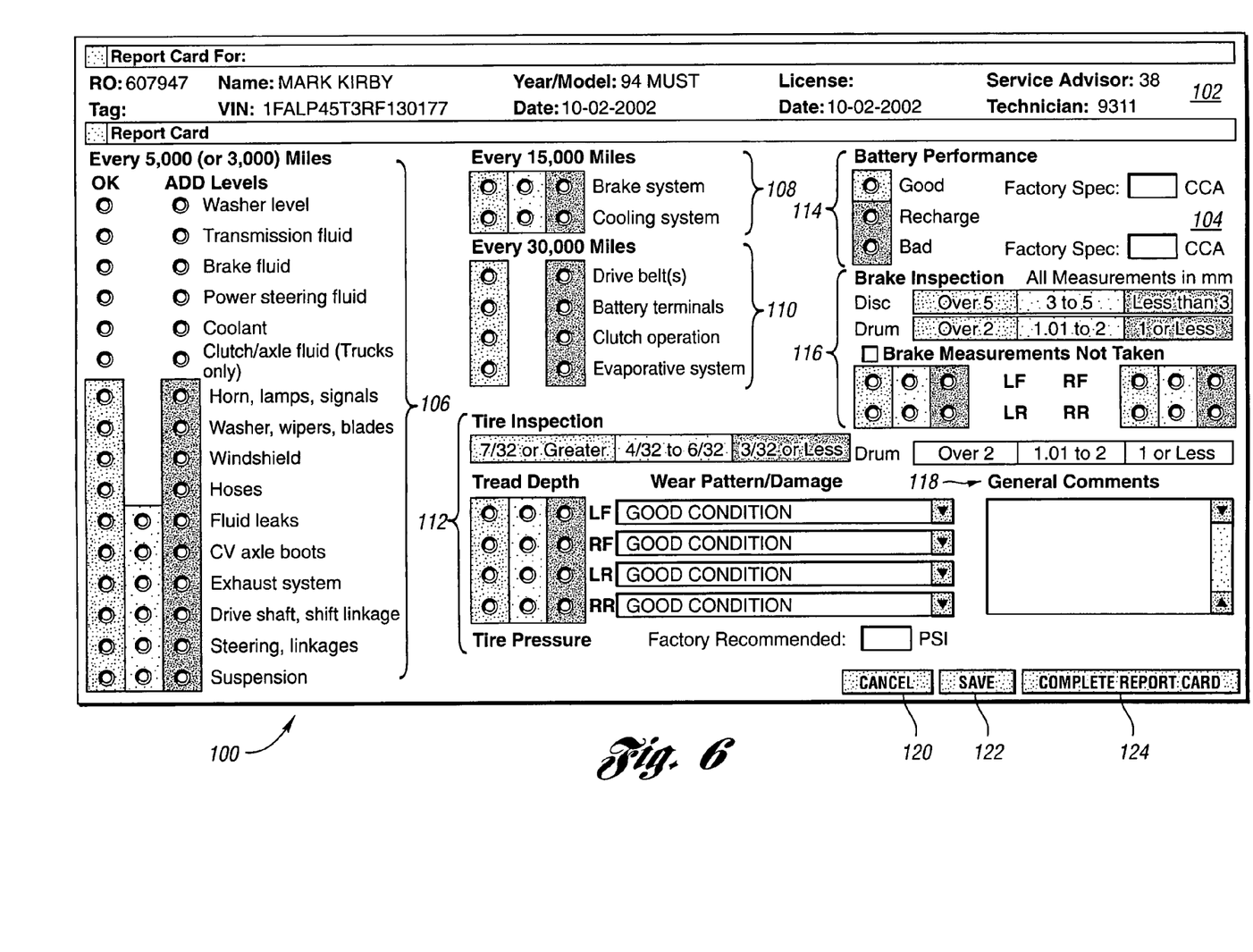
FIG. 6 illustrates a graphical user interface (GUI) for displaying an electronic report card and entering inspection information into the electronic report card according to one embodiment of the present invention.

After verification, an electronic report card form is generated by the report card module and displayed on the hand-held computer. FIG. 6 illustrates a GUI for displaying the electronic report card and entering inspection information into the electronic report card, according to one embodiment of the present invention. GUI 100 includes information section 102 and input section 104. Information section 102 includes information regarding the service of the customer's vehicle, including, but not limited to, repair order, tag, customer name, vehicle identification number (VIN), year/model, mileage, drivers license number, date of repair, service advisor number, and technician number.

Input section 104 includes an "every 5,000 (or 3,000) mile" sub-section 106, an "every 15,000 miles" sub-section 108, an "every 30,000 miles" sub-section 110, a "tire inspection" sub-section 112, a "battery performance" sub-section 114, a "brake inspection" sub-section 116, and a "general comments" sub-section 118. Each sub-section 106 through 116 includes a number of inspection items. Each inspection item is tied either to a color-coded or non-color-coded selection area. In certain embodiments, the color-coded section includes green, yellow, and red sections. Green indicates that the technician has inspected the item and it does not need further attention. Yellow indicates that since there is some wear on an inspected part, repair work will be needed in the near future. For instance, if a technician inspects the brakes and sees that they are fine now, but will need work in the near future, the technician would select the button in the yellow area. Red indicates that an inspected part needs immediate attention. For instance, if a customer came in for an oil change, and in the process of the inspection, the technician discovers very serious tire wear, then the technician would select the button in the red area. In certain embodiments, the non-color coded sections include two radio buttons, one for an "OK" level and one for an "ADD" level.

Sub-section 106 includes, but is not limited to, the following inspection items: washer fluid, transmission fluid, brake fluid, power steering fluid, coolant, clutch/axle fluid for trucks, horn, lamps, signals, washer, wipers, blades, windshield, hoses, fluid leaks, CV axle boots, exhaust system, drive shaft, shift linkage, steering, linkages, and suspension. Sub-section 108 includes, but is not limited to, brake system and cooling system. Sub-section 110 includes, but is not limited to, drive belt(s), battery terminals, clutch operation, and evaporative system. Sub-section 112 includes, but is not limited to, tread depth and wear pattern/damage for each tire, and tire pressure. Sub-section 114 includes, but is not limited to, radio buttons for the status of the battery (good, recharge, and bad). Sub-section 116, includes, but is not limited to, disc and drum measurements for the left front, right front, left rear, and right rear brakes. Sub-section 118 allows the technician to enter general comments about the inspection.

In certain embodiments, the following items are considered required, i.e. failure to check all these items results in an error message: washer fluid, transmission fluid, brake fluid, power steering fluid, coolant, clutch/axle fluid for trucks, horn, lamps, signals, washer, wipers, blades, windshield, hoses, fluid leaks, CV axle boots, exhaust system, drive shaft, shift linkage, steering, linkages, suspension, tread depth and wear pattern/damage for each tire, tire pressure, disc and drum measurements for the left front, right front, left rear, and right rear brakes.

GUI 100 also includes "cancel" button 120, "save" button 122, and "complete report card" button 124. "Cancel" button 120 can be utilized if the technician is informed that the inspection is not necessary. "Save" button 122 can be utilized in the technician is pulled away from filling out the electronic form in favor of another activity. "Complete report card" button 124 can be utilized once the report card form is completed.

Once the technician clicks on "complete report card" button 124, an e-mail or electronic notification containing the report card inspection information can be sent to the service advisor's e-mail address. In certain embodiments, an e-mail alert or electronic notification is sent if the inspection identified concerns, e.g., any yellow or red conditions, as depicted in decision block 42 and block 44 of FIG. 3.

Advantageously, the service advisor can immediately contact the customer after receiving and reviewing the e-mail or electronic notification to recommend additional service based on the inspection results, as depicted in block 46 of FIG. 3. As an additional benefit, the contact can occur while the technician is working on the original repair and/or maintenance task, thus reducing technician downtime. In certain embodiments, the service advisor can recommend repair on inspection items having a yellow and/or red condition, as depicted in block 46. With respect to the yellow condition, the service advisor can mention that repair may be needed during the customer's next visit.

As depicted in blocks 45, 47 and 48 of FIG. 3, if additional repair item(s) are identified, the report card module can transmit additional service needs to the service manager system which appends the appropriate electronic repair order. In certain embodiments, a XML package is transmitted to SM server 24 to add labor line(s) to the electronic repair order. It should be understood that the content, arrangement and language of the generic request XML package can be rearranged, modified and/or supplemented to best fit the communication between SM server 24 and application server 16.

Additionally, data regarding the additional repair item(s) can be stored in SM database 26 for reporting and analysis purposes as depicted in blocks 45 and 48 of FIG. 3. If additional repair item(s) are not sold, comments are entered in a labor line and can be stored in database 26. For example, the comment "customer declined repair" can be entered. Advantageously, this comment can create a process check point during the customer's next visit, thus documenting for both the dealership and the customer that repairs have been declined. The report card module includes functionality for printing and displaying the report card form.

As depicted in block 49 of FIG. 3, the report card module can determine values for selected metrics. Examples of metrics for technicians, include, but are not limited to, report cards processed per day, the percentage of report cards processed with completed inspection, number of alerts, i.e. concerns, generated by inspections. Examples of metrics for service advisors include, but are not limited to, repair orders processed per day, closing ratio defined as the percentage of service needs identified by the inspection that are sold to the customer, and dollar amount of up-sells as a result of the service advisor receiving a red and/or yellow alert. Examples of metrics provided for a cashier at a service/repair center, include, but are not limited to, report cards printed as a percentage of those available to print.

Figure 4:
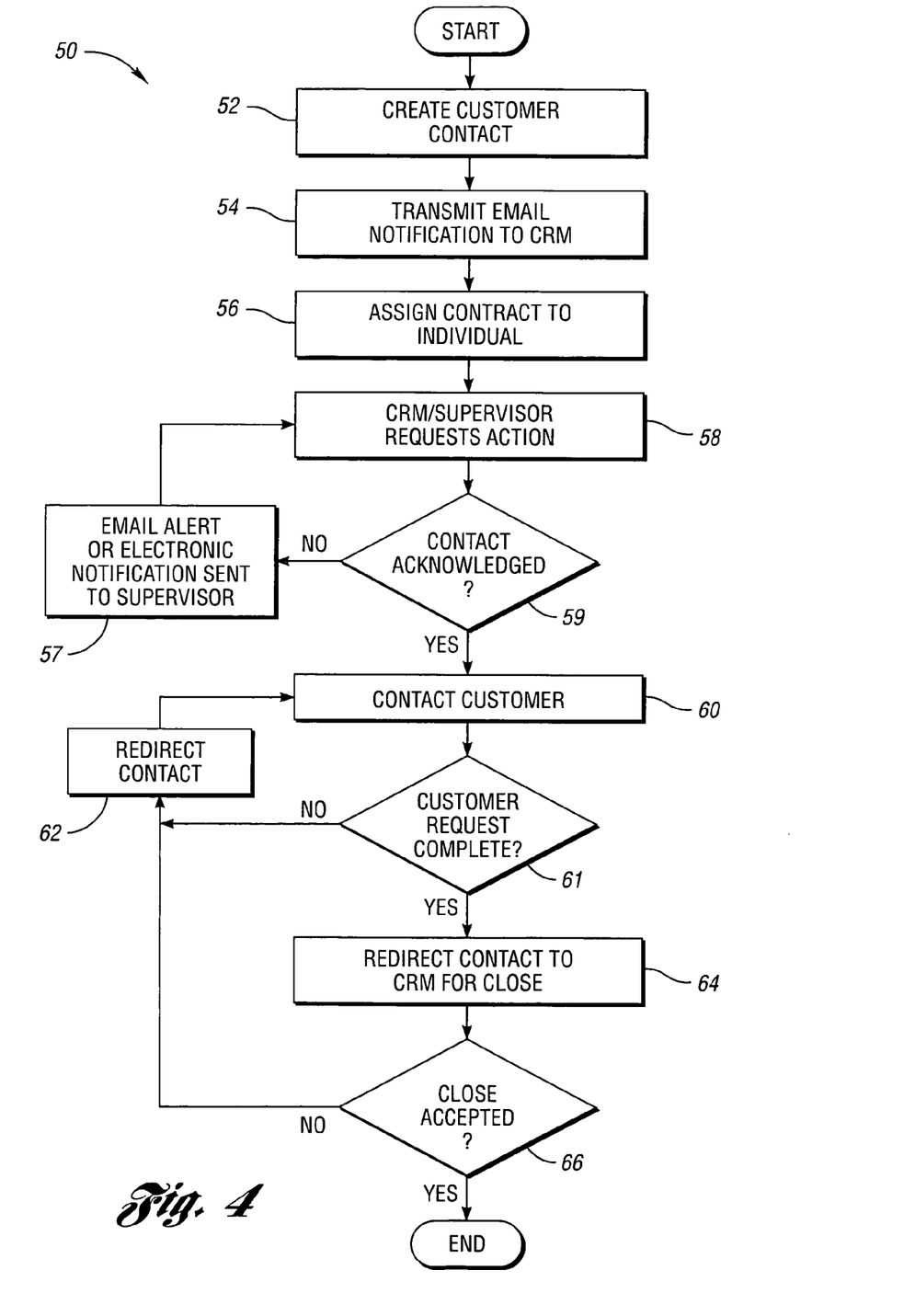
FIG. 4 is a block flow diagram depicting a method embodiment of the present invention.

FIG. 4 is block flow diagram 50 depicting a method embodiment of the present invention. It should be understood that block flow diagram 50 illustrates a series of steps that can be performed according to the present invention. Steps may be modified, added, omitted, or rearranged depending on the particular embodiment of the present invention.

Block flow diagram 50 represents a method of utilizing a concern prevention and resolution ("CP&R") module, residing on application server 16, for tracking and resolving customer concerns relating to a customer's dealership experience. The CP&R module provides a computer-implemented tool for managing customer contacts.

In block 52, a customer contact is created by the CP&R module. The customer contact can be created based on various reasons. For instance, a customer's response to a sales and/or service survey may not meet dealer-specified score levels. Alternatively, the customer contact can be generated because additional customer comments are noted in additional comments area of an electronic follow-up form. Further, a dealership employee can manually enter a customer contact.

Once a customer contact is created, an e-mail or electronic notification is transmitted to a customer relations manager (CRM), as depicted in block 54. As depicted in block 56 and 58, the CP&R module can allow a CRM or supervisor to assign a customer contact to an individual for action. When an individual is assigned a contact, that individual can receive an e-mail notice or electronic notification, containing an ID for the contact.

Figure 7:
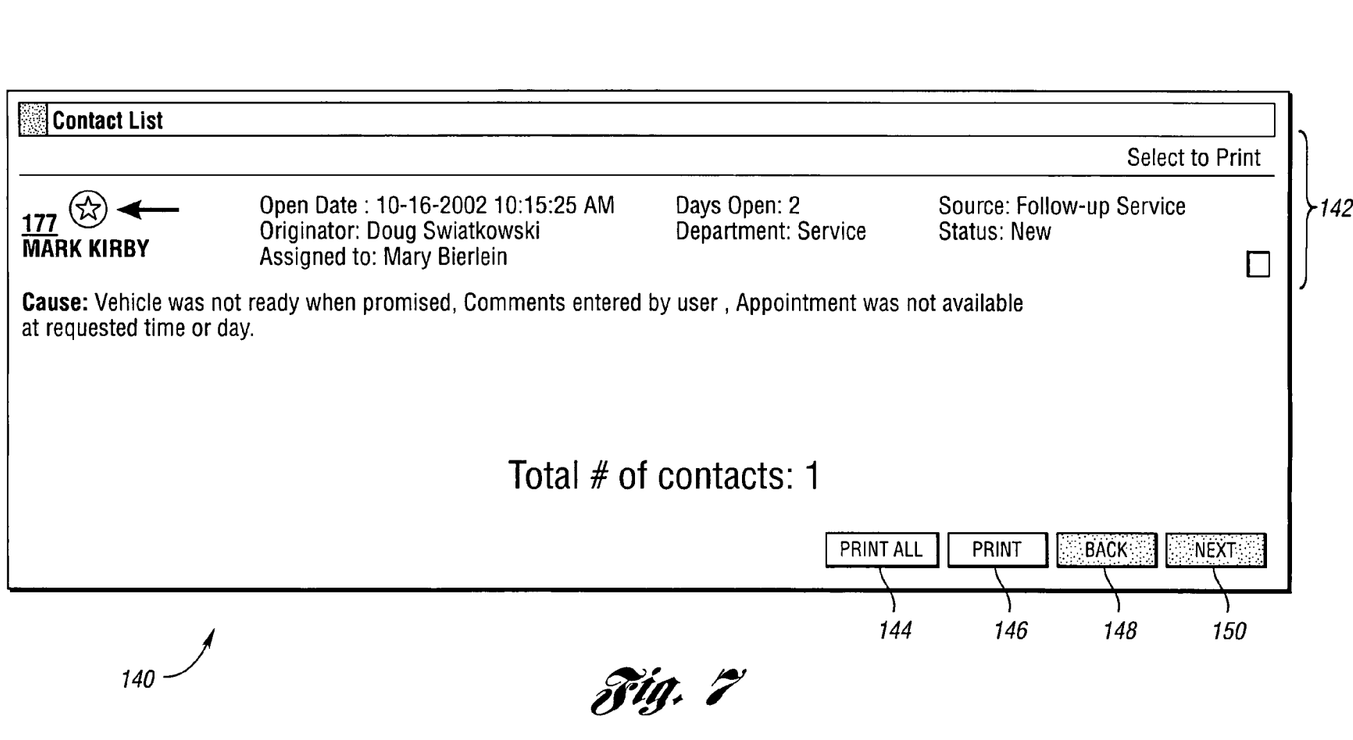
FIG. 7 illustrates a GUI for displaying a list of contacts according to one embodiment of the present invention.

The CP&R can generate a contact list GUI, which displays contact(s) assigned to an individual. The contact list GUI can be displayed upon an individual's request. FIG. 7 illustrates an example of a GUI 140 for displaying a list of contacts, in accordance with one embodiment of the present invention. GUI 140 includes one contact entry 142. It should be understood that a contact list GUI can include several contact entries. Contact entry 142 includes several pieces of information regarding the contact, e.g., contact ID, contact icon, contact name, open date, originator, assigned to person, days open, department, source, status, and cause. According to contact entry 140, the contact icon is a star, signaling that this is a new contact. GUI 140 also includes "print all" button 144, "print" button 146, "back" button 148, and "next" button 150. "Print all" button 144 can be clicked to print all contact entries. "Print" button 146 can be clicked to print the current contact entry. "Back" and "next" buttons 148 and 150 can be used to navigate between contact entries.

Figure 8:
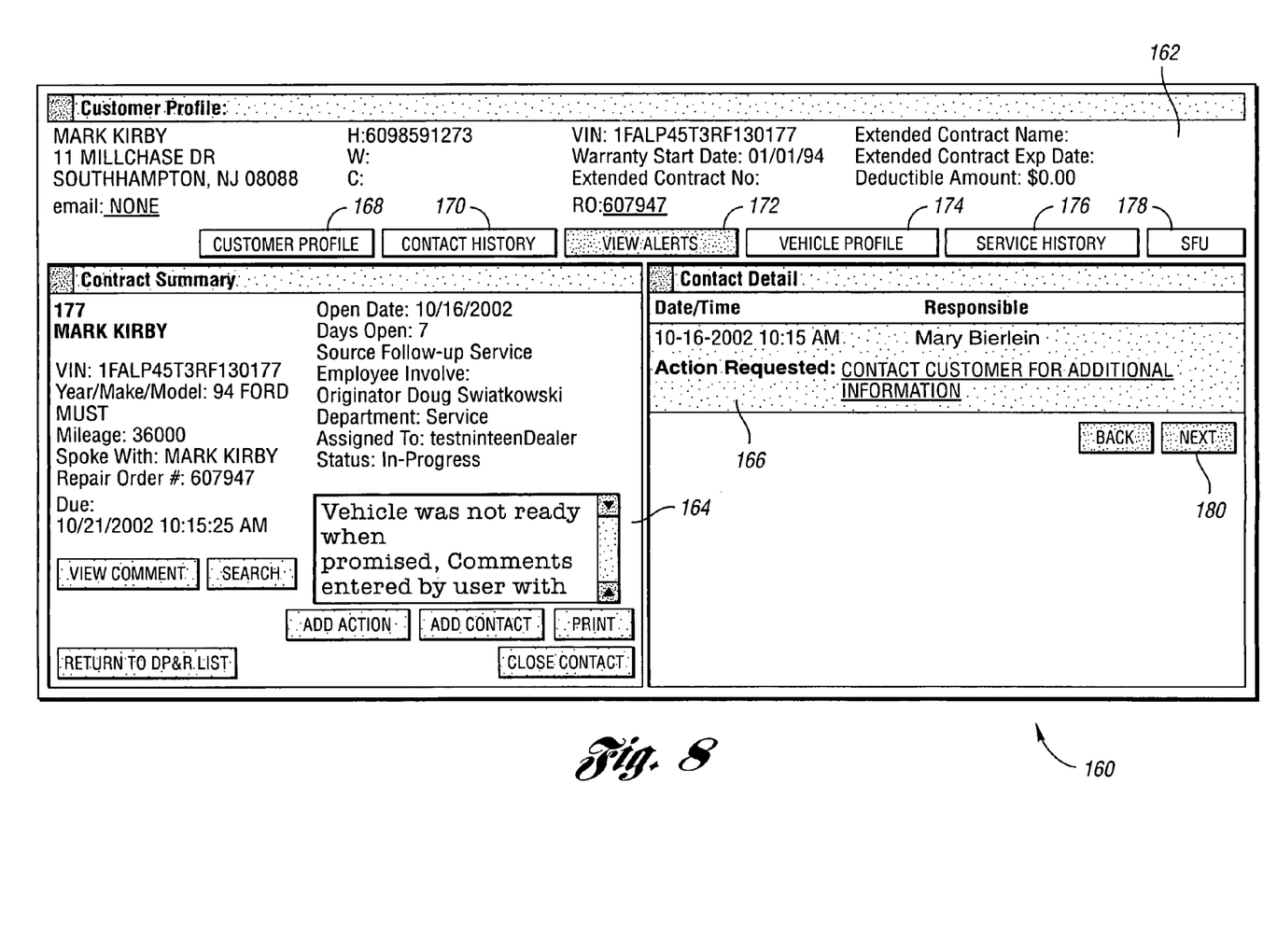
FIG. 8 illustrates a GUI for displaying and entering contact list information according to one embodiment of the present invention.

An individual can click on the contact icon to display a contact information GUI, generated by the CP&R module. FIG. 8 illustrates an example of a contact list GUI 160 for displaying and entering contact list information, in accordance with one embodiment of the present invention. GUI 160 can include three windows, i.e. customer profile window 162, contact summary window 164, and contact detail window 166. Customer profile window 162 includes six buttons, which can be clicked on to provide additional information regarding the contact. The buttons include, but are not limited to, "customer profile" button 168, "contact history" button 170, "view alerts" button 172, "vehicle profile" button 174, "service history" button 176, and "service follow up" button 178. Upon selecting "customer profile" button 168, the module retrieves the customer's profile. In certain embodiments, a XML package is transmitted to SM server 24 to retrieve the customer profile. Computer listing 3 is an example of a retrieval XML package. Upon selecting "contact history" button 170, the module retrieves the contact history. Upon selecting "view alerts" button 172, the module retrieves any alerts for the customer. Upon selecting "vehicle profile" button 174, the module retrieves a vehicle profile for the customer's vehicle. Upon selecting "service history" button 176, the module retrieves the service history for the customer's vehicle. In certain embodiments, a XML package is transmitted to SM server 24 to retrieve the service history. Computer listing 4 is an example of a retrieval XML package for retrieving a service history. Upon selecting "service follow up" button 178, the module retrieves service follow up information for a customer's vehicle.

Contact summary window 164 displays contact information, including, but not limited to, contact date, department involved, and individual assigned to contact. In block 58 of FIG. 4, the CRM can request an action from the individual assigned the contact. Information regarding the requested action can be displayed in contact detail window 166. The CP&R module includes functionality that tracks the acknowledgment of an assigned contact depicted in decision block 59 of FIG. 4. If the contact is not acknowledged within 24 hours an e-mail alert or electronic notification can be automatically forwarded to the assigned individual's supervisor as shown in block 59, at which time additional actions are requested in block 58.

According to contact detail window 166, the action requested is "CONTACT CUSTOMER FOR ADDITIONAL INFORMATION". In this example, the individual contacts the customer to resolve the issue, as depicted by block 60 of FIG. 4. For instance, the individual could offer the customer a free oil change, as the action taken. Once the action is taken, an add action taken sub-window can be displayed by clicking on the "next" button. The sub-window includes, but is not limited to, action taken drop down box, reminder input box, requested action drop down box, comment input box, redirect drop down box, "cancel" button, and "save" button. In certain circumstances, a contact cannot be resolved before it becomes overdue because the customer may not be available. In this situation, the individual can input a convenient date in the reminder input box. Further, the individual can redirect the contact after taking action, as depicted in block 62 of FIG. 4. For instance, the individual can redirect a resolved contact to the originating CRM, which will receive an e-mail or electronic notification regarding the same. Upon clicking on the "save" button, the add action taken sub-window disappears and the action and comments appear in the contact detail window.

Advantageously, the CP&R module collects information for use in tracking and analyzing the CP&R process. For example, the CP&R module automatically track the individual that is assigned to a contact for resolution handling. Additionally, the CP&R module can track the status of the contact. The CP&R module also tracks the average number of days to resolve a contact from its origination date, generating a customer concern file based on one or more answers, failing to meet the one or more standards on a first date, receiving information from the customer regarding the concern transmitting the information to the customer concern file, and transmitting the customer concern file to a concern resolution individual or entity, the customer information being used to resolve the customer concern.

Figure 5:
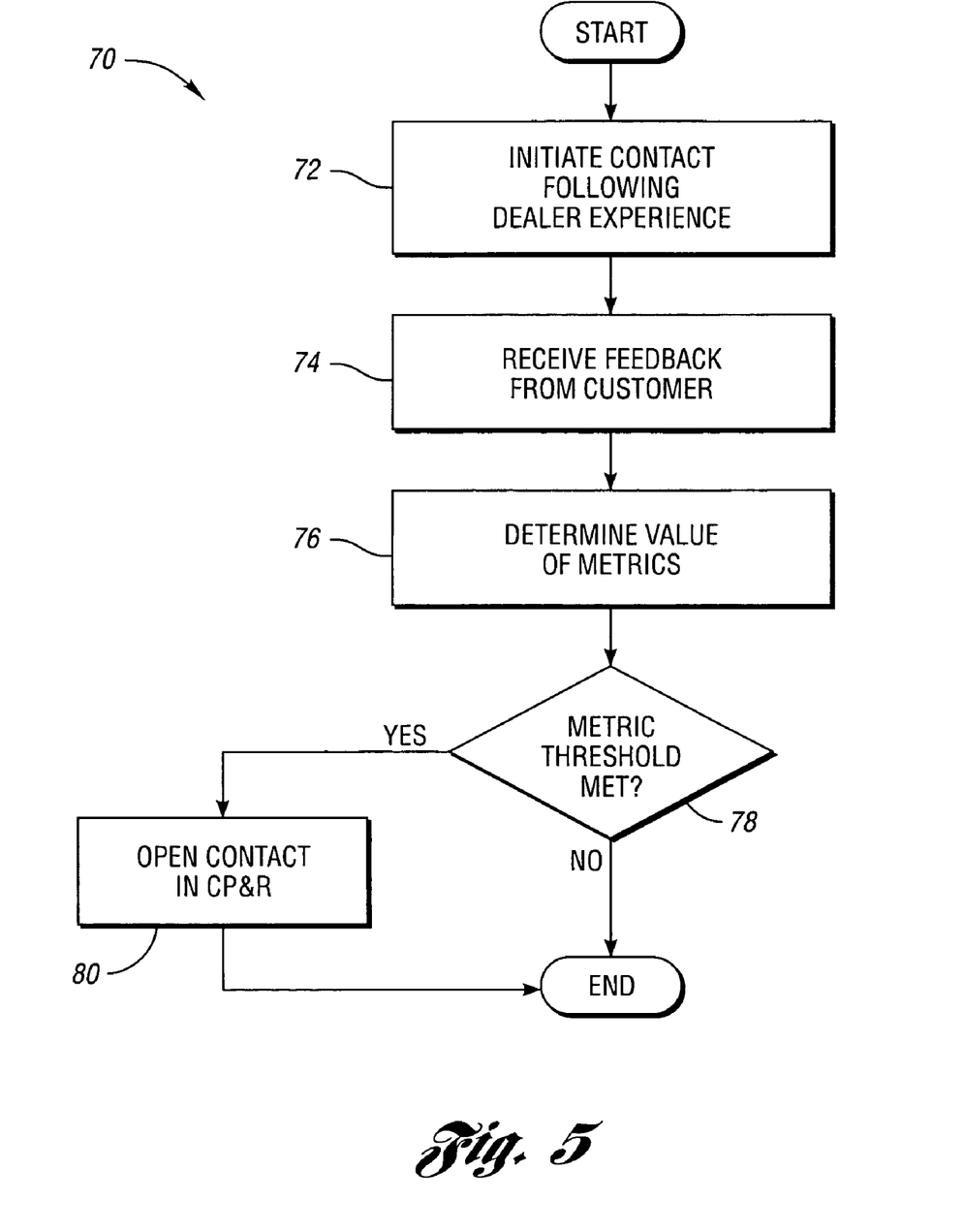
FIG. 5 is a block flow diagram depicting a method embodiment of the present invention.

Block flow diagram 70 of FIG. 5 represents a method of utilizing a follow-up module, residing on application server 16, for tracking follow-up relating to a dealership experience. The follow-up module provides a computer-implemented tool for managing the process of following-up on a customer's dealership experience.

As depicted in block 72, contact is initiated with an individual after a dealership experience, for example, completion of repairs requested by the customer. A follow-up person can utilize the follow-up module to obtain sales and service follow-up call requests for processing. In certain embodiments, XML packages are transmitted to SM server 24 to retrieve sales and service follow-up call requests. Computer listings 5 and 6 are examples of XML packages for retrieving sales and service follow-up call requests, respectfully. As depicted in block 74, feedback is received by the customer after contact is initiated. The contact initiation and feedback collection can be accomplished by the system through an e-mail survey, a follow-up person, follow-up agency, or surveyor, either employed or not employed by a dealership.

In certain embodiments, the contact can be initiated via a telephone call. If the customer agrees to participate in a follow-up survey, the service follow-up person can ask the customer a number of questions, which are contained on an electronic survey document, viewable from a web browser or word processing application. The electronic survey document can include one or more input boxes for inputting answers given to survey questions. Depending on the answers, the follow-up person is directed to the next question on the electronic document.

For example, the follow-up person can ask the individual to rate an experience based on a range (low to high) or yes/no questions. For instance, the individual can be asked "were you greeted by our service staff within two minutes of your arrival?" If the individual answers affirmatively, the electronic survey document prompts the follow-up person to ask another question. If the individual answers negatively, the electronic survey document may prompt the follow-up person to ask different question, addressing the negative response.

In other embodiments, the contact can be initiated by automatically transmitting a survey to a customer's e-mail address. This alternative may be utilized if data stored in the SM server 24 indicates that the customer prefers e-mail contact. The e-mail contains a request to conduct a survey via a web link that is provided. Once the individual clicks on the web link, a survey GUI generated by the follow-up module and hosted by application server 16 is displayed for completing the survey.

In either case described above, telephone or e-mail contact, a dealer can identify a trigger value wherein a customer's response may trigger the follow-up module to automatically generate a customer contact file that is transmitted to the CP&R module for further processing and resolution. For example, any dissatisfaction may trigger the generation of a customer contact file.

As depicted by block 76, the follow-up module can determine a value for a metric based on the individual feedback and other information collected during the follow-up process. In certain situations, pre-selected thresholds for individual customer response will be met as shown in decision 78 of FIG. 5. In this case, the follow-up module can automatically open a customer contact in CP&R as shown in block 80. In certain embodiments, the amount of time used to complete a survey can be tracked as a metric. The follow-up module can store a time stamp indicating when survey data entry begins and ends. A survey time can be defined as the time between the two time stamps. The survey time is relied upon to track the performance of individuals responsible for the survey. Additionally, the follow-up module can track the number of survey started and finished for individual surveyors. This information can be used to compute a percentage of surveys completed by a specific surveyor on a specific day.

While the best mode for carrying out the invention has been described in detail, those familiar with the art to which this invention relates will recognize various alternative designs and embodiments for practicing the invention as defined by the following claims.

What is claimed:

1. A computer-implemented method for collecting and communicating inspection information for a mechanism, the method comprising:

receiving, at a first computer, repair order information from an original electronic repair order to initiate a repair on the mechanism;

generating, at the first computer, an electronic inspection form including a questionnaire for inputting inspection information;

receiving, into the electronic inspection form, the inspection information while in the process of repairing the mechanism based on the repair order information;

determining whether the electronic inspection form is complete based on whether at least one of the electronic inspection form is generated and the inspection information is received;

transmitting, to a second computer, concurrent with the process of repairing the mechanism based on the repair order information, at least a portion of the received inspection information and the repair order information;

causing the original electronic repair order, at the second computer, to be appended with the at least a portion of the received inspection information to obtain an electronic appended repair order, wherein information contained on the electronic appended repair order is suitable for communication to an individual requesting repair of the mechanism;

executing at least one of the steps of generating the electronic inspection form and receiving the inspection information, and the step of determining whether the electronic inspection form is complete one or more times; and determining a value for a technician based metric which corresponds to a number of electronic inspection forms processed with a complete inspection as a percentage of those available to be completed by a technician based on the number of times the at least one of the steps of generating the electronic inspection form and receiving the inspection information are executed, and the step of determining whether the electronic inspection form is executed.

2. The method of claim 1 further comprising communicating information from the electronic appended repair order to the individual.

3. The method of claim 1 further comprising transmitting an e-mail alert or electronic notification for alerting a service advisor of at least a portion of the inspection information.

4. The method of claim 1 wherein the repair order information is received by a service management (SM) computer.

5. The method of claim 1 wherein the questionnaire includes a plurality of inspection items, each inspection item including two or more attention level indicators, the two or more attention level indicators including a green indicator, a yellow indicator, and a red indicator.

6. The method of claim 5 further comprising accessing the appended repair order, wherein the attention level for each inspection item contained in the electronic appended repair order is used as the basis for following up with the customer regarding potential service on the mechanism.

7. The method of claim 1 wherein the mechanism is an automobile.

8. The method of claim 1 further comprising determining a first value for a first technician based metric which corresponds to a number of electronic inspection forms processed per day by the technician.

9. The method of claim 1 further comprising determining whether the electronic appended repair order is available to print.

10. The method of claim 9 further comprising executing the steps of causing the original electronic repair order to be appended with the at least a portion of the received inspection information to obtain the electronic appended repair order and determining whether the electronic appended repair order is available to print one or more times.

11. The method of claim 10 further comprising determining a value for a cashier based metric which corresponds to a number of electronic appended repair orders printed as a percentage of those available to print based on the number of times the steps of causing the original electronic repair order to be appended with the at least a portion of the received inspection information to obtain the electronic appended repair order and determining whether the electronic appended repair order is available to print are executed.

12. A computer-implemented method for collecting and communicating inspection information for a mechanism, the method comprising:

receiving, at a first computer, repair order information from an original electronic repair order to initiate a repair on the mechanism;

generating, at the first computer, an electronic inspection form including a questionnaire for inputting inspection information;

receiving, into the electronic inspection form, the inspection information while in the process of repairing the mechanism based on the repair order information;

transmitting, to a second computer, concurrent with the process of repairing the mechanism based on the repair order information, at least a portion of the received inspection information and the repair order information;

causing the original electronic repair order, at the second computer, to be appended with the at least a portion of the received inspection information to obtain an electronic appended repair order; wherein information contained on the electronic appended repair order is suitable for communication to an individual requesting repair of the mechanism;

determining whether the electronic appended repair order is available to print;

executing the steps of causing the original electronic repair order to be appended with the at least a portion of the received inspection information to obtain the electronic appended repair order and determining whether the electronic appended repair order is available to print one or more times; and determining a value for a cashier based metric which corresponds to a number of the electronic appended repair orders printed as a percentage of those available to print based on the number of times the steps of causing the original electronic repair order to be appended with the at least a portion of the received inspection information to obtain the electronic appended repair order and determining whether the electronic appended repair order is available to print is executed.

13. The method of claim 12 further comprising determining whether the electronic inspection form is complete based on whether at least one of the electronic inspection form is generated and the inspection information is received.

14. The method of claim 13 further comprising executing at least one of the steps of generating the electronic inspection form and receiving the inspection information, and the step of determining whether the electronic inspection form is complete one or more times.

15. The method of claim 14 further comprising determining a value for a technician based metric which corresponds to a number of electronic inspection forms processed with a complete inspection as a percentage of those available to be completed by a technician based on the number of times the at least one of the steps of generating the electronic inspection form and receiving the inspection information are executed, and the step of determining whether the electronic inspection form is executed.

* * * * *

UNITED STATES PATENT AND TRADEMARK OFFICE
CERTIFICATE OF CORRECTION

PATENT NO. : 7,613,627 B2 Page 1 of 1
APPLICATION NO. : 10/770145
DATED : November 3, 2009
INVENTOR(S) : Doyle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1552 days.

Signed and Sealed this

Nineteenth Day of October, 2010

David J. Kappos
*Director of the United States Patent and Trademark Office*